G. WESTINGHOUSE.
FRICTION DRAFT GEAR.
APPLICATION FILED NOV. 28, 1906.
1,168,448.
Patented Jan. 18, 1916.
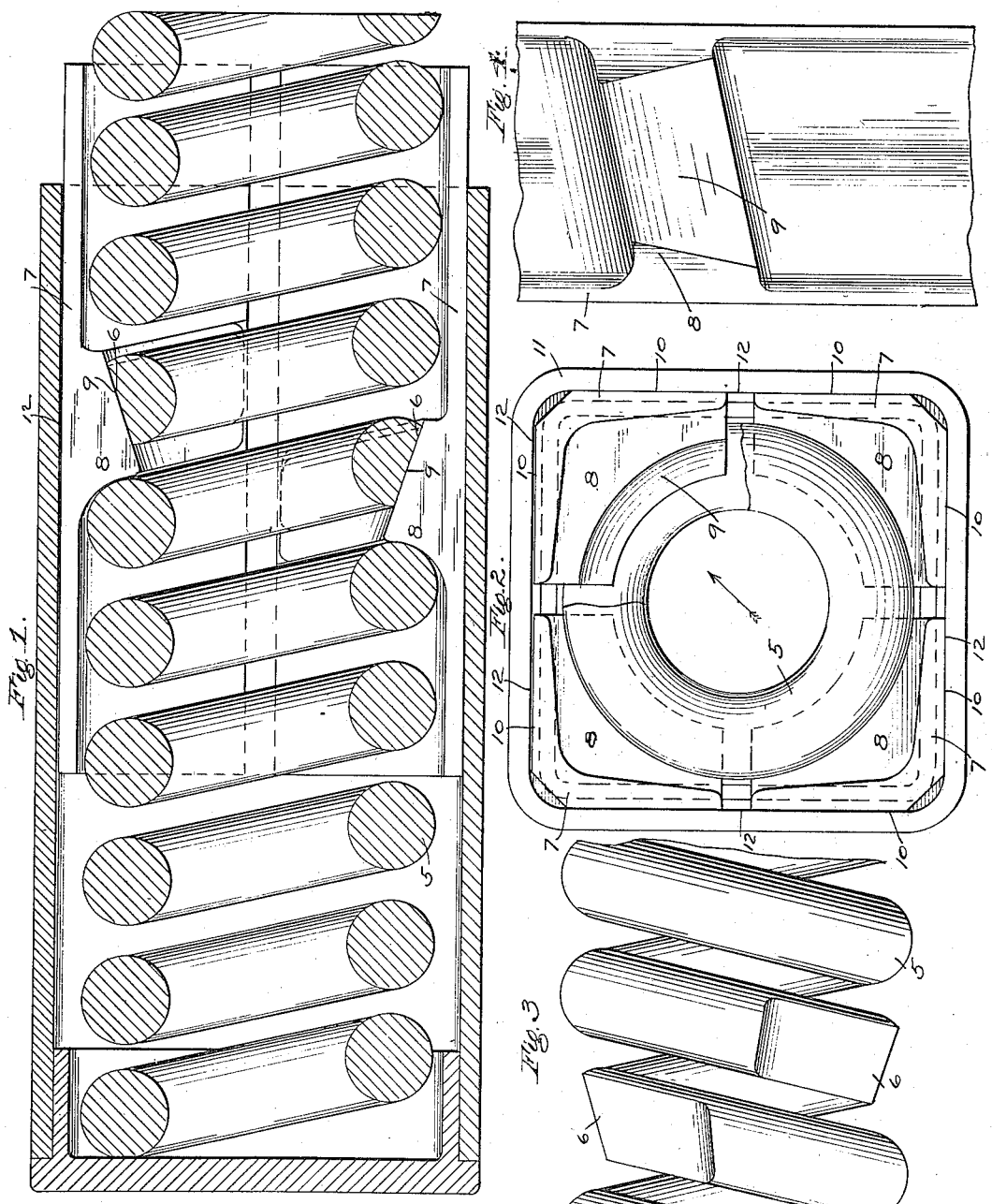
WITNESSES
INVENTOR
George Westinghouse
by E. Wright
Att'y.

UNITED STATES PATENT OFFICE.

GEORGE WESTINGHOUSE, OF PITTSBURGH, PENNSYLVANIA, ASSIGNOR TO WESTINGHOUSE AIR BRAKE COMPANY, OF PITTSBURGH, PENNSYLVANIA, A CORPORATION OF PENNSYLVANIA.

FRICTION DRAFT-GEAR.

1,168,448.      Specification of Letters Patent.      Patented Jan. 18, 1916.

Application filed November 28, 1906. Serial No. 345,422.

*To all whom it may concern:*

Be it known that I, GEORGE WESTINGHOUSE, a citizen of the United States, residing at Pittsburgh, in the county of Allegheny and State of Pennsylvania, have invented new and useful Improvements in Friction Draft-Gear, of which the following is a specification.

This invention relates to yielding resistance mechanism for transmitting stresses between members having a limited relative movement, and is particularly adapted to be applied as a railway draft and buffing appliance for transmitting draft and buffing strains between the draw bar and the framing of the car or truck and for absorbing and dissipating the sudden shocks and jars to which the draft rigging is subjected in the ordinary running and shifting of railway cars.

The object of my present invention is to provide an improved mechanism having a combined friction and spring resistance which shall be extremely simple in construction, inexpensive to manufacture, and efficient and durable in its practical operation.

Broadly stated, my improvement may be said to comprise a substantially helical resistance spring having one or more of its turns or coils, or a portion thereof, formed with an inclined or beveled surface for engaging a corresponding wedging surface on an adjacent member and forcing the frictional surfaces into engagement with each other.

In the accompanying drawings, Figure 1 is a longitudinal section of a yielding resistance mechanism embodying my improvements; Fig. 2 an end view of the same showing a part of the spring broken away; Fig. 3 an elevation of a portion of the helical resistance spring; and Fig. 4 an inside view of a portion of one of the segmental friction strips, looking in the direction of the arrow, (Fig. 2) and showing the helical projection for engaging the beveled surface on one of the coils of the spring.

According to my improvement, as shown in the drawing, a coiled spring 5, which is preferably substantially helical, has formed upon one of its turns or coils, or a portion thereof, a beveled surface 6, which is inclined relatively to the longitudinal axis of the spring. This beveled surface may be formed in any suitable manner, and at any desired point upon the spring, but according to the preferred construction, this beveled surface is formed by cutting away a portion of the metal upon the outer side of one of the intermediate turns or coils of the spring. In this way one portion of the spring may be made to act as a preliminary resistance and the other part as a main resistance spring in conjunction with the frictional resistance.

A plurality of friction strips, or segments, 7, extending longitudinally, are mounted upon the outside of the coiled spring, and each segment is provided upon its inner side with a projection 8, in the form of a part of a helix adapted to extend in between two adjacent coils of the spring, and also having one face formed as an inclined or wedging surface 9 for engaging with the beveled surface 6 on the spring. The outer or frictional surface 10 of the segments may be of any desired form, but is preferably V-shaped in cross-section; that is, formed with faces arranged at an angle to each other and extending outward from the axis of the spring to meet and form a longitudinal edge.

The coiled spring, with its friction segments, is surrounded by and inclosed in a metal casing 11, which may be of any desired shape in cross-section, and is provided with inside frictional surfaces 12 for coöperating with the frictional surfaces of the segments. As shown in the drawing, only four frictional segments are employed, and the angle between the outer friction faces is substantially 90°, so that in this case the casing is substantially square in its cross-sectional outline. A different number of segments may, however, be employed, if desired, and the angle between the outer friction faces may be varied to give a greater or lesser amount of wedging action, and consequently vary the amount of frictional resistance exerted between the friction faces of the segments and the corresponding frictional surfaces of the casing. The casing is made somewhat shorter than the spring coil to allow for the maximum movement in the compression of the mechanism, and the friction segments are preferably of such length as to extend nearly to the end of the spring and to allow sufficient clearance between the other end of the segments and the inner end of the casing. The distance from the outer end of the segment to the helical projection on its inner face varies in the successive segments to correspond with the pitch of the helical spring, so that the outer ends of the segments will be in the same transverse plane, and the spring is prevented from turning or shifting its position in the segments by shoulders of the projections engaging the notched portion of the spring.

When my improved yielding resistance mechanism is used as a friction draft gear, it is applied between the follower plates of the draft rigging of a railway car and the draft and buffing stresses which are transmitted from the draw bar cause the movement of one of the follower plates toward the other and the compression of the resistance spring. As the spring begins to compress, it naturally first yields at its weakest turn or coil, which is the one partly cut away, and the amount that this coil is weakened may be made anything that is desired by cutting away more or less material, in order to provide the proper wedging action upon the inclined faces of the helical projections of the segments; consequently the beveled surface of this coil is forced against the inclined surfaces of the friction segments with the desired pressure and expands the same into frictional contact with the surfaces on the inside of the casing, thereby creating sufficient frictional resistance, which in connection with the resistance of the other or main portion of the spring, serves to hold the segments from sliding to any great extent until the outer end portion of the spring is compressed to the point of allowing the follower plate to bear against the ends of the segments. In this manner the portion of the spring from the weak coil outward constitutes a preliminary resistance spring, which acts to resist and transmit the minor shocks and stresses without causing a frictional sliding movement of the segments and a compression of the other or main portion of the spring. In the case of the larger stresses and shocks, the follower moves farther inward forcing the segments to slide into the casing and compressing the main portion of the resistance spring, thereby exerting the combined action of the spring and the frictional resistance between the segments and the inner frictional surfaces of the casing for absorbing and transmitting the stresses. If desired, the casing may be made slightly tapering, in order to increase the frictional resistance between the segments and the casing as the segments are forced inward. Then when the follower starts outward, as stresses is being relieved, the coils of the outer portion of the spring begin to expand and relieve the pressure upon the wedge surfaces of the coil and the projections of the segments, whereupon the expansion of the main portion of the spring operates to effect a smooth and complete release of the friction segments and to force the same back to their normal position.

Having now described my invention, what I claim as new and desire to secure by Letters Patent, is:—

1. A yielding resistance mechanism comprising a continuous helical resistance spring having one only of its intermediate coils partly cut away to form a weakened portion of less cross-sectional area than the remainder of the spring, and provided with an inclined wedging surface, a member having a corresponding wedging surface for engaging therewith, and means coöperating with said member for producing frictional resistance.

2. A yielding resistance mechanism comprising a continuous resistance spring having one of its intermediate coils of less cross-sectional area and weaker than the remainder of the spring, and provided with an inclined wedging surface, a plurality of longitudinal segments each having a projection provided with a corresponding wedging surface for coöperating with the inclined surface of the coil, and means coöperating with said segment for producing frictional resistance.

3. A yielding resistance mechanism comprising a continuous resistance spring having one only of its intermediate coils provided with an inclined wedging surface, a plurality of longitudinal segments having helical projections provided with corresponding wedging surfaces and extending between the adjacent coils of the spring whereby the expansion of the spring operates to release the segments, and means coöperating with said segments for producing frictional resistance.

In testimony whereof I have hereunto set my hand.

GEO. WESTINGHOUSE.

Witnesses:
H. C. TENER,
GEO. V. MILLIGAN.